US012645204B2

(12) United States Patent
Fukumoto

(10) Patent No.: US 12,645,204 B2
(45) Date of Patent: Jun. 2, 2026

(54) INFORMATION PROCESSING APPARATUS, STORAGE MEDIUM, AND ANALYSIS METHOD

(71) Applicant: Tokyo Electron Limited, Tokyo (JP)

(72) Inventor: Toshiyuki Fukumoto, Yamanashi (JP)

(73) Assignee: TOKYO ELECTRON LIMITED, Tokyo (JP)

( * ) Notice: Subject to any disclaimer, the term of this patent is extended or adjusted under 35 U.S.C. 154(b) by 401 days.

(21) Appl. No.: 18/212,270

(22) Filed: Jun. 21, 2023

(65) Prior Publication Data

US 2023/0418268 A1  Dec. 28, 2023

(30) Foreign Application Priority Data

Jun. 24, 2022  (JP) ................................. 2022-102079

(51) Int. Cl.
*G05B 19/418*  (2006.01)

(52) U.S. Cl.
CPC ... *G05B 19/4183* (2013.01); *G05B 19/41875* (2013.01)

(58) Field of Classification Search
CPC .......... G05B 19/4183; G05B 19/41875; G05B 2219/31455; G05B 2219/45031; G05B 19/4184; G05B 23/0221; G05B 23/0235; G05B 2219/2602; H01L 21/67242
See application file for complete search history.

(56) References Cited

U.S. PATENT DOCUMENTS

| | | | | |
|---|---|---|---|---|
| 10,223,069 | B2 * | 3/2019 | Nakamura | ................. G06F 7/08 |
| 2018/0217812 | A1 * | 8/2018 | Nakamura | .............. G06F 16/00 |
| 2019/0198405 | A1 | 6/2019 | Li et al. | |
| 2021/0165851 | A1 * | 6/2021 | Kitajima | ................. G06F 17/15 |
| 2021/0348985 | A1 * | 11/2021 | Kawatsu | ............ G05B 23/0235 |

FOREIGN PATENT DOCUMENTS

| | | |
|---|---|---|
| JP | 2018120533 A | 8/2018 |
| JP | 2021002295 A | 1/2021 |
| JP | 2022-003664 A | 1/2022 |

* cited by examiner

*Primary Examiner* — Manuel A Rivera Vargas
(74) *Attorney, Agent, or Firm* — Venjuris, P.C.

(57) ABSTRACT

An information processing apparatus includes: a time-series data acquisition unit that acquires a plurality of time-series data pieces output from one or more substrate processing apparatuses; an analysis unit that analyzes similarity between the time-series data pieces acquired from the substrate processing apparatuses that are performing a processing according to the same sequence, by using dynamic time warping, thereby digitizing a difference between the time-series data pieces; and an output control unit that outputs an analysis result based on the difference between the time-series data pieces.

10 Claims, 8 Drawing Sheets

*FIG. 5*

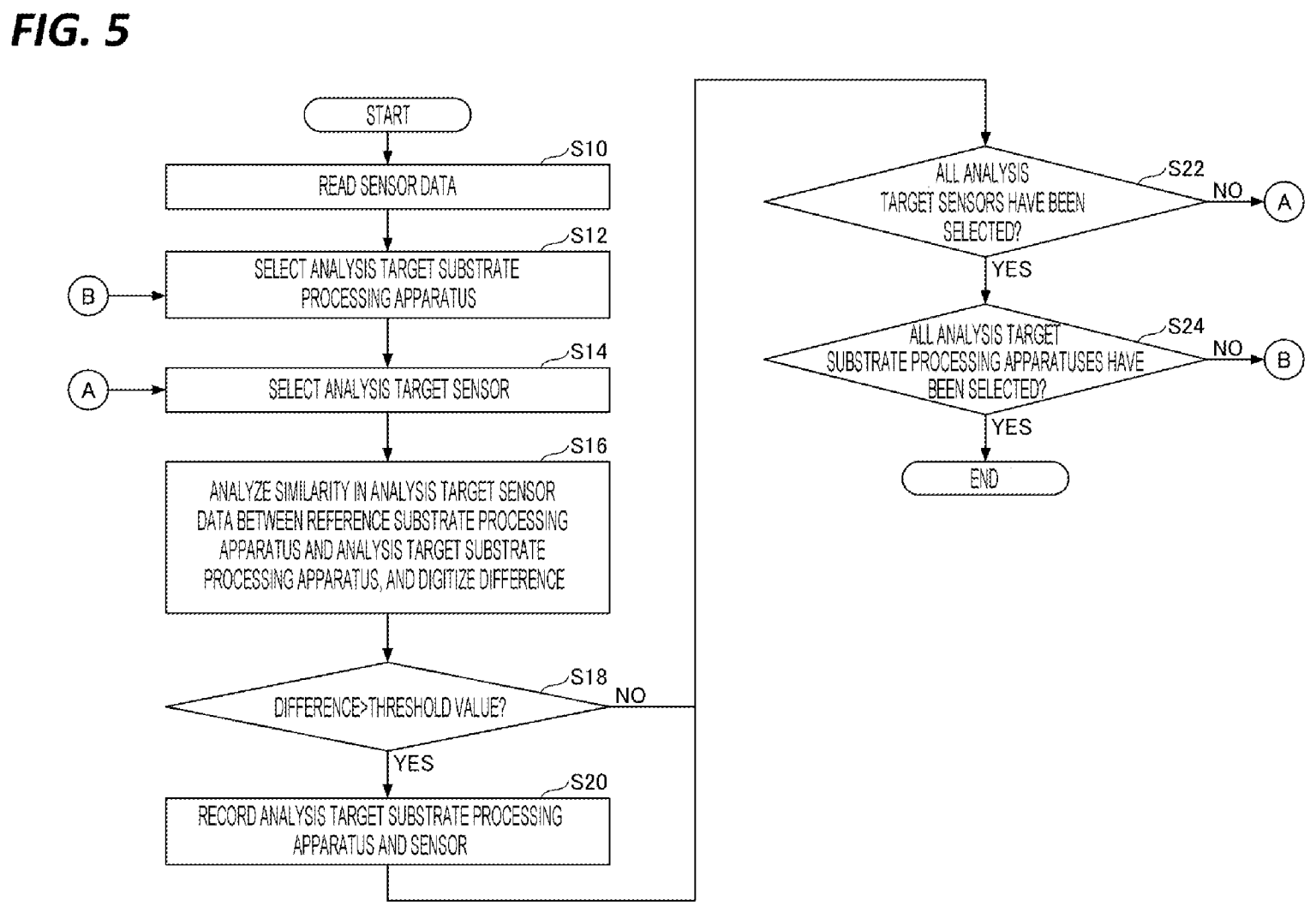

START

S10 — READ SENSOR DATA

S12 — SELECT ANALYSIS TARGET SUBSTRATE PROCESSING APPARATUS

S14 — SELECT ANALYSIS TARGET SENSOR

S16 — ANALYZE SIMILARITY IN ANALYSIS TARGET SENSOR DATA BETWEEN REFERENCE SUBSTRATE PROCESSING APPARATUS AND ANALYSIS TARGET SUBSTRATE PROCESSING APPARATUS, AND DIGITIZE DIFFERENCE

S18 — DIFFERENCE > THRESHOLD VALUE?
    YES

S20 — RECORD ANALYSIS TARGET SUBSTRATE PROCESSING APPARATUS AND SENSOR

S22 — ALL ANALYSIS TARGET SENSORS HAVE BEEN SELECTED?
    NO → A
    YES

S24 — ALL ANALYSIS TARGET SUBSTRATE PROCESSING APPARATUSES HAVE BEEN SELECTED?
    NO → B
    YES

END

B

A

LOG DATA OF SENSORS A, IN WHICH TIME AXIS IS
CONVERTED, AND BEHAVIORS OF SENSOR DATA OF
SENSORS ARE MATCHED.

VALUE OF SENSOR A

CONVERTED TIME

——— FIRST SUBSTRATE PROCESSING APPARATUS
- - - - SECOND SUBSTRATE PROCESSING APPARATUS

START

S50 READ SENSOR DATA

S52 SELECT ANALYSIS TARGET SENSOR

S54 ANALYZE SIMILARITY IN SENSOR DATA BEFORE AND AFTER MAINTENANCE, FOR SUBSTRATE PROCESSING APPARATUS THAT HAS BEEN SUBJECTED TO MAINTENANCE, AND DIGITIZE DIFFERENCE

S56 DIFFERENCE>THRESHOLD VALUE?

NO

YES

S58 RECORD SENSOR

C

S60 ALL ANALYSIS TARGET SENSORS HAVE BEEN SELECTED?

NO

C

YES

END

INFORMATION PROCESSING APPARATUS, STORAGE MEDIUM, AND ANALYSIS METHOD

CROSS-REFERENCE TO RELATED APPLICATIONS

The present application is based on and claims priority from Japanese Patent Application No. 2022-102079, filed on Jun. 24, 2022, with the Japan Patent Office, the disclosure of which is incorporated herein in its entirety by reference.

TECHNICAL FIELD

The present disclosure relates to an information processing apparatus, a storage medium, and an analysis method.

BACKGROUND

In the manufacturing and operation processes of the substrate processing apparatuses, various individual differences occur, such as differences in parts themselves, differences in assembly, or deterioration of sensors, etc. in operations. In order to suppress the non-uniformity in wafer processing results, it is necessary to reduce individual differences among substrate processing apparatuses. Therefore, it has been important to analyze individual differences in substrate processing apparatuses.

For example, a technique for detecting an abnormal sign of a semiconductor manufacturing apparatus has been known (see, e.g., Japanese Patent Laid-Open Publication No. 2022-003664).

SUMMARY

According to an aspect of the present disclosure, the information processing apparatus includes: a time-series data acquisition unit configured to acquire a plurality of time-series data pieces output from one or more substrate processing apparatus; an analysis unit that is configured to analyze similarity between the time-series data pieces acquired from the substrate processing apparatuses that are performing a processing according to the same sequence, by using dynamic time warping, thereby digitalizing a difference between the time-series data pieces; and an output control unit configured to output an analysis result based on the difference between the time-series data pieces.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

FIG. 5 is a flowchart of an example of processing in an analysis which is performed on a difference in sensor data by the information processing apparatus according to the present embodiment, by using dynamic time warping.

DETAILED DESCRIPTION

In the following detailed description, reference is made to the accompanying drawings, which form a part thereof. The illustrative embodiments described in the detailed description, drawings, and claims are not meant to be limiting. Other embodiments may be utilized, and other changes may be made without departing from the spirit or scope of the subject matter presented here.

Hereinafter, embodiments for carrying out the present invention will be described with reference to drawings.

<System Configuration>

Figure 1:
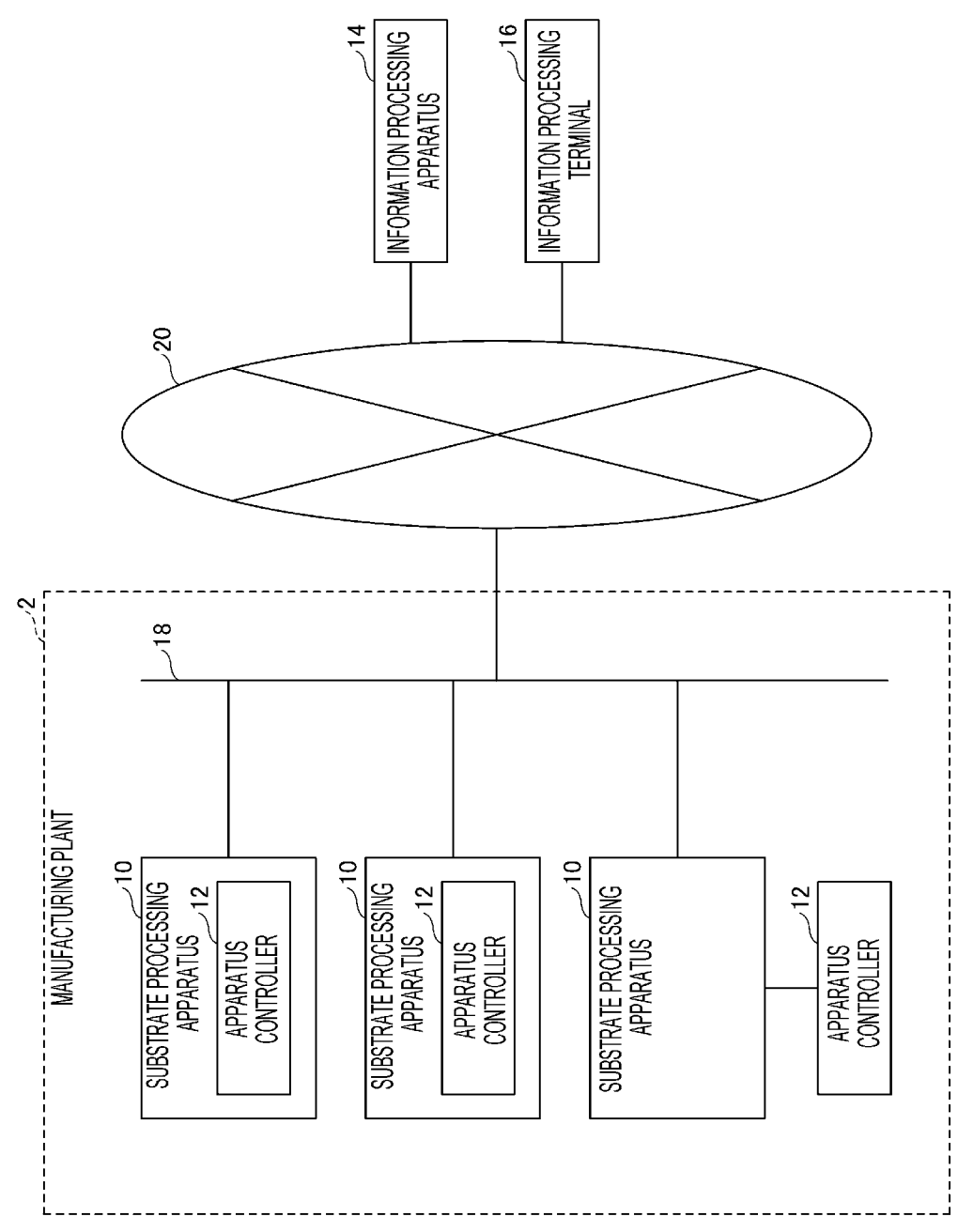
FIG. 1 is a configuration diagram of an example of a substrate processing system according to the present embodiment.

FIG. 1 is a configuration diagram of an example of a substrate processing system according to the present embodiment. A substrate processing system 1 of FIG. 1 includes one or more substrate processing apparatuses 10, apparatus controllers 12, an information processing apparatus 14, and an information processing terminal 16. One or more substrate processing apparatuses 10 and the apparatus controllers 12 are installed in a manufacturing plant 2. The information processing apparatus 14 and the information processing terminal 16 may be installed in the manufacturing plant 2, or may be installed in places other than the manufacturing plant 2. The information processing terminal 16 is operated by a user such as a person in charge of apparatuses or a person in charge of analysis, for the substrate processing apparatuses 10 installed in the manufacturing plant 2.

The substrate processing apparatuses 10, the apparatus controllers 12, the information processing apparatus 14, and the information processing terminal 16 are communicably connected via networks 18 and 20 such as the Internet and a local area network (LAN).

The substrate processing apparatus 10 is, for example, an apparatus that performs processing of substrates such as film formation processing, etching processing, or ashing processing, that is, an apparatus that processes semiconductor wafers or an apparatus that processes glass substrates for flat panel displays. The substrate processing apparatus 10 is, for example, a semiconductor manufacturing apparatus, a heat treatment apparatus, or a film forming apparatus.

The substrate processing apparatus 10 receives control instructions based on a recipe or a macro from the apparatus controller 12 and performs a processing of the recipe or the macro. The substrate processing apparatus 10 performs a processing according to a sequence such as a recipe or a macro.

As illustrated in FIG. 1, the substrate processing apparatus 10 may be equipped with the apparatus controller 12, or may not be necessarily equipped with the apparatus controller 12 as long as a communicable connection is made. The apparatus controller 12 has a computer that controls the substrate processing apparatus 10. The apparatus controller 12 outputs control instructions that control control components of the substrate processing apparatus 10 according to a recipe or a macro, so as to cause the substrate processing apparatus 10 to perform a processing based on the recipe or the macro.

The apparatus controller 12 has a function of a man-machine interface that receives instructions for the substrate processing apparatus 10 from the user, and provides information related to the substrate processing apparatus 10, to the user.

The apparatus controller 12 transmits time-series data indicating the device state of the substrate processing apparatus 10 to the information processing apparatus 14. The time-series data indicating the device state of the substrate processing apparatus 10 is, for example, sensor data output from a sensor provided in the substrate processing apparatus 10. The time-series data indicating the device state of the substrate processing apparatus 10 may be power data for controlling, for example, a heater or a motor provided in the substrate processing apparatus 10, or control data for controlling the opening degree of a valve provided in the substrate processing apparatus 10. The time-series data indicating the device state of the substrate processing apparatus 10 may be transmitted to the information processing apparatus 14 by the substrate processing apparatus 10. The time-series data indicating the device state includes identification information of a recipe or a macro being executed, and identification information of a step indicating the degree of progress of processing of the recipe or the macro being executed.

The information processing apparatus 14 receives and stores the time-series data indicating the device state of the substrate processing apparatus 10. The information processing apparatus 14 analyzes the similarity between time-series data pieces acquired from the substrate processing apparatuses 10 that are performing processes based on the same recipe or macro, by using a method called dynamic time warping (DTW) as described below, and digitizes a difference between the time-series data pieces.

The time-series data pieces whose similarity is to be analyzed are the same type of time-series data pieces acquired in the same sequence. For example, for sensor data, the same type of time-series data pieces are sensor data of sensors provided at the same positions in the substrate processing apparatuses 10, respectively.

The information processing apparatus 14 outputs the analysis result of the time-series data pieces acquired from the substrate processing apparatuses 10 that are performing processes based on the same recipe or macro. The analysis result of the time-series data may be output by being displayed on, for example, a display of the information processing apparatus 14, being displayed on, for example, a display of the information processing terminal 16, or being transmitted to the user by using, for example, an e-mail.

In this way, the information processing apparatus 14 analyzes the similarity between the time-series data pieces acquired from the substrate processing apparatuses 10 that are performing processes based on the same recipe or macro, by using dynamic time warping to be described below, so as to digitize a difference between behaviors of the time-series data pieces. The digitized difference between behaviors of the time-series data pieces may be used for analyzing an individual difference between the substrate processing apparatuses 10.

The information processing terminal 16 is, for example, a personal computer (PC) or a smart phone operated by the user such as a person in charge of apparatuses or a person in charge of analysis, for the substrate processing apparatuses 10 installed in the manufacturing plant 2.

The substrate processing system 1 of FIG. 1 is an example, and it is needless to say that there are various system configuration examples depending on applications or purposes. For example, the substrate processing system 1 may have various configurations, such as a configuration where the apparatus controllers 12 of the substrate processing apparatuses 10 are integrated into an apparatus controller for the plurality of substrate processing apparatuses 10 or a configuration where each apparatus controller is further divided.

Hardware Configuration

Figure 2:
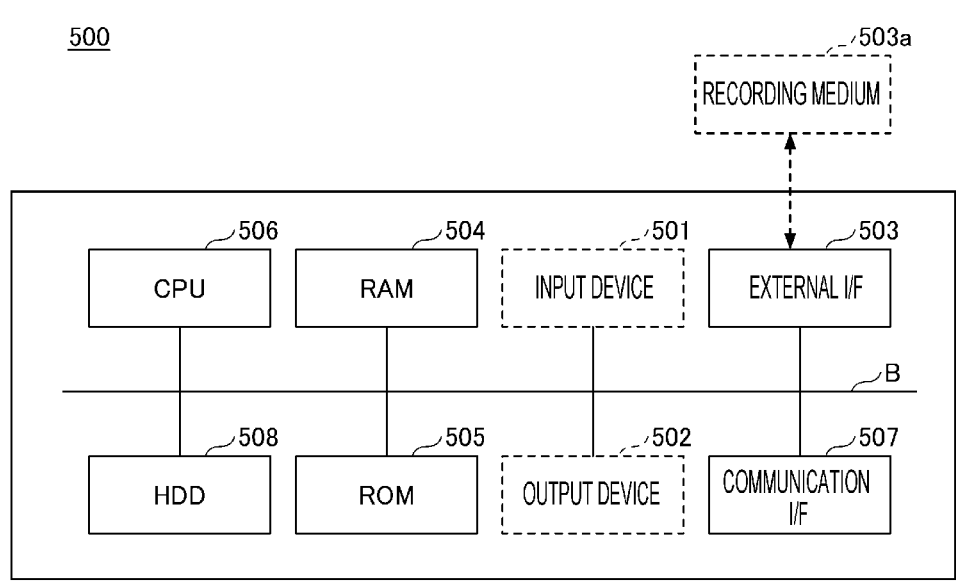
FIG. 2 is a hardware configuration diagram of an example of a computer.

The apparatus controller 12, the information processing apparatus 14, and the information processing terminal 16 of the substrate processing system 1 illustrated in FIG. 1 are realized by, for example, a computer having a hardware configuration as illustrated in FIG. 2. FIG. 2 is a hardware configuration diagram of an example of the computer.

A computer 500 of FIG. 2 includes, for example, an input device 501, an output device 502, an external interface (UF) 503, a random access memory (RAM) 504, a read only memory (ROM) 505, a central processing unit (CPU) 506, a communication OF 507 and a hard disk drive (HDD) 508, which are interconnected by a bus B. The input device 501 and the output device 502 may be connected when necessary in one mode for use.

The input device 501 is, for example, a keyboard, a mouse, or a touch panel, and is used by the user to input each operation signal. The output device 502 is, for example, a display, and displays the results of processing performed by the computer 500. The communication OF 507 is an interface that connects the computer 500 to the network 18 or 20. The HDD 508 is an example of a non-volatile storage device that stores programs or data.

The external OF 503 is an interface to an external device. The computer 500 may perform reading and/or writing from/to a recording medium 503*a* such as a secure digital (SD) memory card via the external OF 503. The ROM 505 is an example of a non-volatile semiconductor memory (storage device) in which programs or data are stored. The RAM 504 is an example of a volatile semiconductor memory (storage device) in which programs or data are temporarily held.

The CPU 506 is an arithmetic device that realizes the overall control or functions of the computer 500 by reading programs or data from a storage device such as the ROM 505 or the HDD 508 onto the RAM 504, and performing a processing.

The apparatus controller 12, the information processing apparatus 14, and the information processing terminal 16 in FIG. 1 may realize various functions by, for example, the hardware configuration of the computer 500 in FIG. 2.

Functional Configuration

Figure 3:
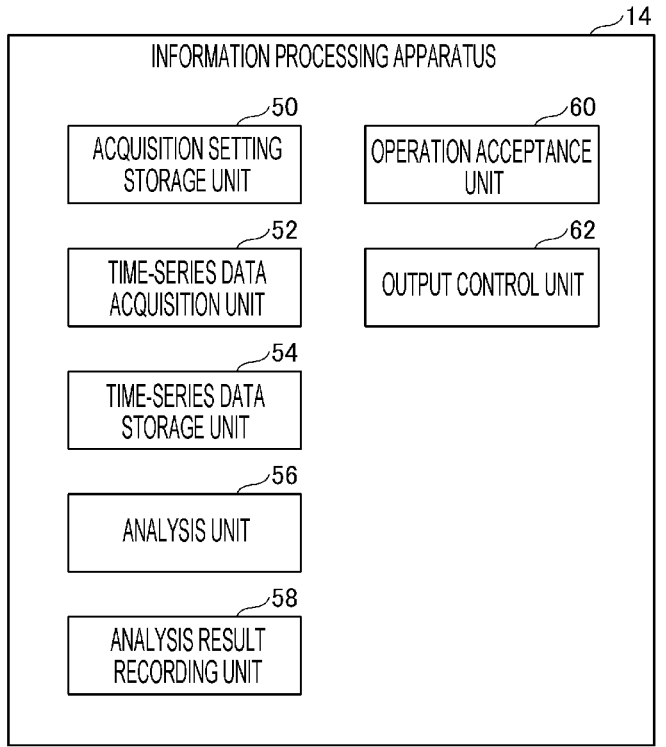
FIG. 3 is a functional block diagram of an example of an information processing apparatus according to the present embodiment.

The information processing apparatus 14 of the substrate processing system 1 according to the present embodiment is realized by, for example, functional blocks as illustrated in FIG. 3. FIG. 3 is a functional block diagram of an example of the information processing apparatus according to the present embodiment. In the functional block diagram of FIG. 3, configurations that are unnecessary for the description of the present embodiment are omitted in the illustration.

The information processing apparatus 14 of FIG. 3 performs a program for the information processing apparatus 14 so as to realize an acquisition setting storage unit 50, a time-series data acquisition unit 52, a time-series data storage unit 54, an analysis unit 56, an analysis result recording unit 58, an operation accepting unit 60, and an output control unit 62.

The acquisition setting storage unit 50 stores acquisition settings necessary for the information processing apparatus 14 to acquire time-series data pieces indicating the device states of one or more substrate processing apparatuses 10 installed in the manufacturing plant 2. The acquisition settings include information such as communication settings for communicating with the substrate processing apparatus 10 or the apparatus controller 12, timing settings for acquiring time-series data, and type settings for selecting time-series data to be acquired.

The time-series data acquisition unit 52 acquires the time-series data indicating the device state of the substrate processing apparatus 10 according to the acquisition settings stored in the acquisition setting storage unit 50. The time-series data storage unit 54 stores the time-series data indicating the device state of the substrate processing apparatus 10, which is acquired by the time-series data acquisition unit 52. For example, the time-series data storage unit 54 stores, for example, sensor data output from an analysis target sensor provided in the substrate processing apparatus 10.

The analysis unit 56 reads the same type of time-series data pieces acquired in the same sequence, from the time-series data storage unit 54, and analyzes the similarity of the same type of time-series data pieces by dynamic time warping. For example, for the analysis of similarity between sensor data pieces of different substrate processing apparatuses 10, the analysis unit 56 analyzes the similarity of data pieces of the same type of sensors provided at the same positions in the different substrate processing apparatuses 10, through dynamic time warping. For the analysis of similarity between sensor data pieces of a sensor provided in one substrate processing apparatus 10 at different timings (e.g., before and after maintenance), the analysis unit 56 analyzes the similarity between sensor data pieces of the sensor of one substrate processing apparatus 10 at different timings, through dynamic time warping.

The analysis unit 56 digitizes the analyzed similarity between the time-series data pieces, as a difference between the time-series data pieces, as described below. The similarity between the time-series data pieces, which is analyzed by the analysis unit 56, may be digitized as a difference between behaviors of the time-series data pieces. When a difference between behaviors of the time-series data pieces is not greater than a threshold value, the analysis unit 56 determines that no individual difference is occurring in the substrate processing apparatuses 10. When a difference between behaviors of the time-series data pieces is greater than a threshold value, the analysis unit 56 determines that an individual difference is occurring in the substrate processing apparatuses 10, and records the analysis result into the analysis result recording unit 58.

For example, for the analysis result of sensor data pieces of different substrate processing apparatuses 10, the analysis unit 56 records identification information of the substrate processing apparatus 10 and the sensor in which the individual difference is occurring. For the analysis result of sensor data pieces of a sensor provided in one substrate processing apparatus 10 at different timings, for example, before and after the maintenance, the analysis unit 56 records identification information of the sensor in which the individual difference is occurring.

The operation accepting unit 60 receives an operation from the user. The output control unit 62 displays and outputs information such as the analysis result on, for example, the display of the information processing apparatus 14 or the information processing terminal 16 according to the operation received from the user. The output control unit 62 may output information such as the analysis result by a mail, a printout, or an alarm.

Processing

In the present embodiment, descriptions will be made on an example in which a difference between behaviors of sensor data pieces acquired from sensors provided in the substrate processing apparatuses 10 is digitized, and an analysis is made on individual differences of the substrate processing apparatuses 10. The individual differences reflect, for example, differences in parts themselves, differences in assembly, or deterioration of sensors, etc. in operations in the substrate processing apparatuses 10.

<<Analysis and Operation Using Dynamic Time Warping, on Individual Differences in Substrate Processing Apparatuses—Part 1>>

Figure 4:
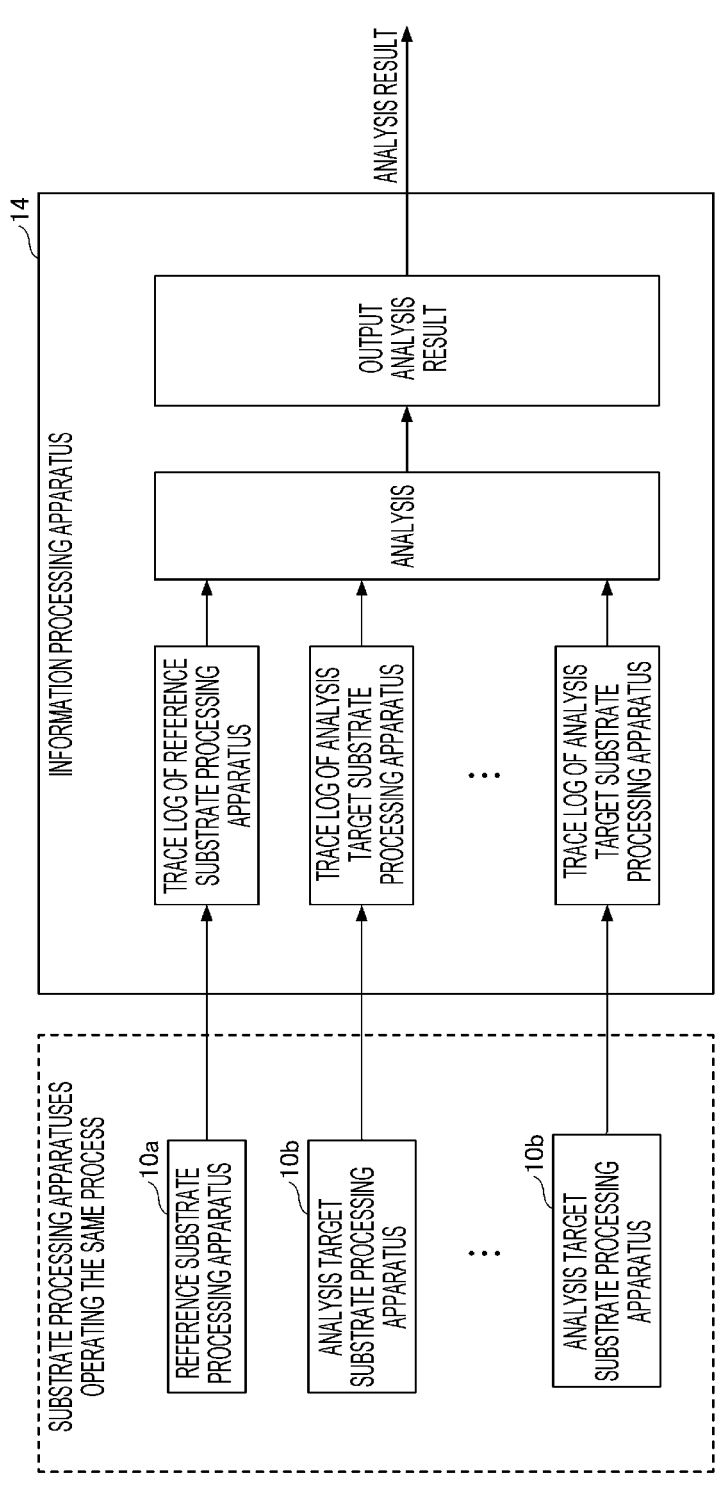
FIG. 4 is an explanatory diagram of an example of a method in the substrate processing system according to the present embodiment, by which an analysis using dynamic time warping, on an individual difference between substrate processing apparatuses, is useful for the operation of the substrate processing apparatuses.

In the present embodiment, an analysis using dynamic time warping, on an individual difference between the substrate processing apparatuses 10, is useful for the operation of the substrate processing apparatuses 10 as follows. FIG. 4 is an explanatory diagram of an example of a method in the substrate processing system according to the present embodiment, by which an analysis using dynamic time warping, on an individual difference between the substrate processing apparatuses, is useful for the operation of the substrate processing apparatuses.

FIG. 4 illustrates a reference substrate processing apparatus 10a, and one or more analysis target substrate processing apparatuses 10b, as the substrate processing apparatuses 10 that are operating the same process. The reference substrate processing apparatus 10a and one or more analysis target substrate processing apparatuses 10b are the substrate processing apparatuses 10 that are operating the same process according to the same recipe or macro. The reference substrate processing apparatus 10a, and the analysis target substrate processing apparatuses 10b are set in advance by the user.

The reference substrate processing apparatus 10a is the substrate processing apparatus 10 that becomes a reference for comparison with the analysis target substrate processing apparatuses 10b, and is, for example, the first substrate processing apparatus 10 installed in the manufacturing plant 2, or the substrate processing apparatus 10 that is operating for the longest time. The analysis target substrate processing apparatus 10b is the substrate processing apparatus 10 to be compared with the reference substrate processing apparatus 10a. FIG. 4 illustrates an example in which one reference substrate processing apparatus 10a, and a plurality of analysis target substrate processing apparatuses 10b are present.

The information processing apparatus 14 acquires information related to sensor data of a sensor provided in the reference substrate processing apparatus 10a, as a trace log of the reference substrate processing apparatus 10*a*. The trace log includes sensor data, identification information of a recipe or a macro that was being executed when the sensor data was output from the sensor, and identification information of a step indicating the degree of progress of processing of the recipe or the macro.

The information processing apparatus 14 acquires information related to sensor data of a sensor provided in each of the analysis target substrate processing apparatuses as a trace log of the analysis target substrate processing apparatus 10*b*. The information processing apparatus 14 uses the respective trace logs of the reference substrate processing apparatus 10*a* and the analysis target substrate processing apparatus which are operating the same process, such that the similarity between sensor data pieces of the reference substrate processing apparatus 10*a* and the analysis target substrate processing apparatus 10*b* is analyzed by using dynamic time warping, and then the difference in the sensor data pieces is digitized.

In the information processing apparatus 14, a sequence to be analyzed, such as a film formation recipe, a purge recipe, or a cleaning recipe, is set. Further, in the information processing apparatus 14, a sensor to be analyzed is set. The sensor to be analyzed is the same type of sensors provided in both the reference substrate processing apparatus 10*a* and the analysis target substrate processing apparatus 10*b*.

The information processing apparatus 14 notifies the user of the information of the analysis target substrate processing apparatus 10*b* and the sensor in which a difference in sensor data from the reference substrate processing apparatus 10*a* exceeds a threshold value, as an analysis result. In the operation illustrated in FIG. 4, the analysis may be executed by instructions of the user, or the analysis may be periodically automatically executed.

In the information processing apparatus 14, a threshold value used for determining whether the difference between the sensor data pieces of the reference substrate processing apparatus 10*a* and the analysis target substrate processing apparatus 10*b* is an allowable value is set. Different threshold values or the same threshold value may be set for sensors.

When the analysis is executed, the information processing apparatus 14 reads trace logs of the reference substrate processing apparatus 10*a* and the analysis target substrate processing apparatus 10*b*, which correspond to the latest processing of the sequence to be analyzed. The information processing apparatus 14 uses the read trace logs to analyze the difference between the sensor data pieces of the reference substrate processing apparatus 10*a* and the analysis target substrate processing apparatus 10*b* in the analysis target sequence, for example, according to the procedure illustrated in FIG. 5.

FIG. 5 is a flowchart of an example of processing in an analysis which is performed on the similarity between sensor data pieces by the information processing apparatus according to the present embodiment, by using dynamic time warping.

In step S10, the analysis unit 56 of the information processing apparatus 14 reads trace logs of the reference substrate processing apparatus 10*a* and the analysis target substrate processing apparatuses 10*b* from the time-series data storage unit 54.

In step S12, the analysis unit 56 selects one unprocessed substrate processing apparatus from the analysis target substrate processing apparatuses 10*b*. In step S14, the analysis unit 56 selects one unprocessed sensor from analysis target sensors of the substrate processing apparatus 10*b* selected in step S12. The analysis unit 56 takes the sensor selected in step S14, as a target to be analyzed in step S16.

In step S16, the analysis unit 56 uses the trace logs of the reference substrate processing apparatus 10*a* and the analysis target substrate processing apparatus 10*b*, so as to analyze the similarity in the analysis target sensors in the reference substrate processing apparatus 10*a* and the analysis target substrate processing apparatus 10*b* through dynamic time warping.

Figure 6:
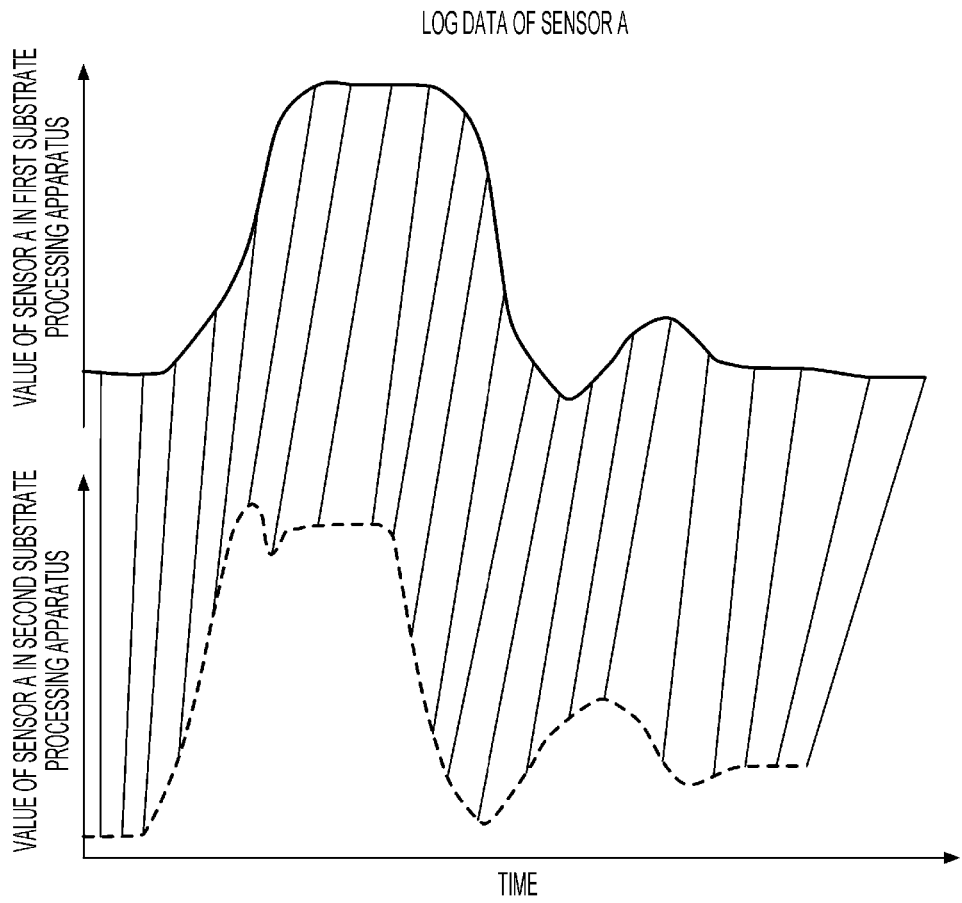
FIG. 6 is a view of an example of log data of sensors A, the log data being time-series data.
Figure 7:
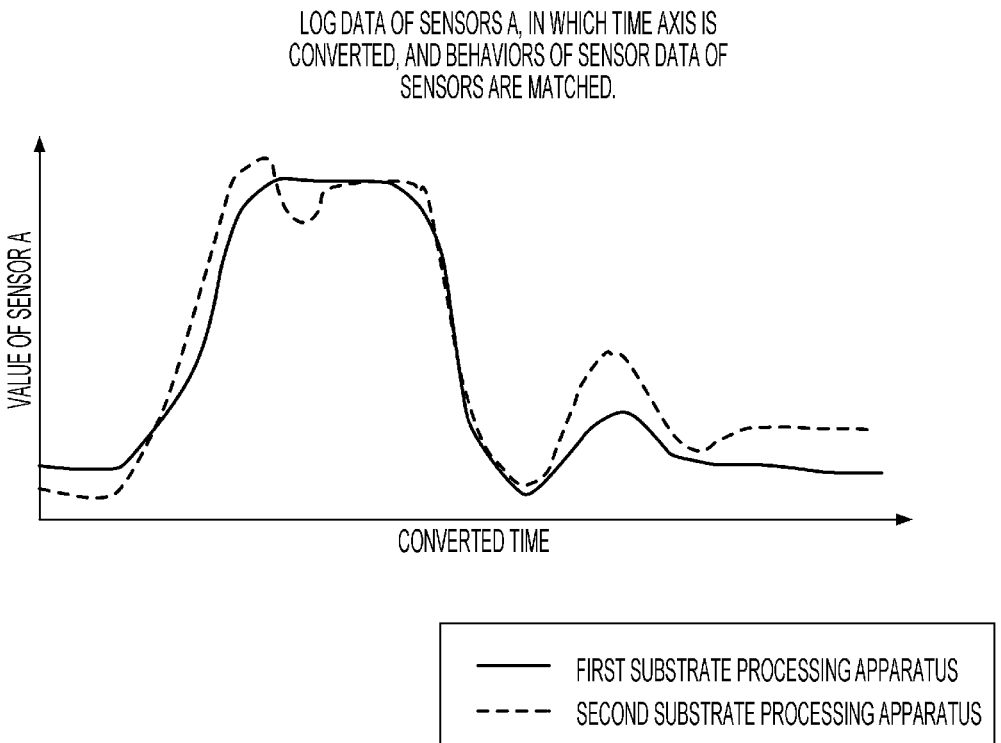
FIG. 7 is a view of an example of log data, in which the time axis is converted, and behaviors of sensor data of the sensors A are matched.

Here, descriptions will be made on the analysis using dynamic time warping, on the similarity in sensor data, with reference to FIG. 6 and FIG. 7. FIG. 6 is a view of an example of log data of sensors A, the log data being time-series data. FIG. 7 is a view of an example of log data, in which the time axis is converted, and behaviors of sensor data of the sensors A are matched.

In FIG. 6, sensor data of the sensor A of the first substrate processing apparatus 10, and sensor data of the sensor A of the second substrate processing apparatus 10 are expressed as log data. For example, the first substrate processing apparatus 10 is the reference substrate processing apparatus 10*a*. The second substrate processing apparatus 10 is the analysis target substrate processing apparatus 10*b*.

In the dynamic time warping, for example, as illustrated in FIG. 6, when two sensor data pieces, which are time-series data, are given, for example, as illustrated in FIG. 7, the time axis of the two sensor data pieces is converted, and the behaviors of the two sensor data pieces are matched as much as possible. As a result, through the dynamic time warping, the length, the number of measurement points, and the number of data samples may be matched for the two sensor data pieces which are time-series data.

The dynamic time warping is a method of partially delaying each time-series data piece in the time direction, so as to generate two data strings having the same length for two time-series data pieces, in which behaviors such as increase/decrease are matched. In generating these data strings, for the two same-length data strings to be generated, an optimization calculation is performed such that the average absolute value of the difference between data values at points with the same number from the beginning is minimized. In the dynamic time warping, the similarity may be obtained even if the length or the cycle is different between the two time-series data pieces. Since the dynamic time warping is a known technique, the descriptions thereof will be omitted.

In the present embodiment, from the two sensor data pieces whose time axis has been converted as in FIG. 7, the similarity between the two sensor data pieces is analyzed through dynamic time warping, and, for example, the difference between behaviors of the two sensor data pieces is digitized as follows. In the digitization method described below, normalization or a correlation coefficient is used. By using the normalization or the correlation coefficient, it is possible to use the same threshold value for even different sensors in the present embodiment when the degree of the magnitude of the digitized difference between the behaviors of the sensor data pieces is discussed.

For example, the analysis unit 56 of the information processing apparatus 14 performs an integral calculation on the absolute value of the difference between the two sensor data pieces whose time axis has been converted as illustrated in FIG. 7, so that it is possible to use a normalized value obtained by dividing the integral value by (resolution of sensor)×(length of sensor data with converted time axis). The integral value of the absolute value of the difference between the two sensor data pieces indicates an area between two curves in FIG. 7.

Further, the analysis unit 56 calculates the maximum value of the absolute value of the difference between the two sensor data pieces whose time axis has been converted as illustrated in FIG. 7, so that it is possible to use a normalized value obtained by dividing the maximum value by the sensor resolution. Further, the analysis unit 56 may use a correlation coefficient of the two sensor data pieces whose time axis has been converted as illustrated in FIG. 7.

In the present embodiment, the dynamic time warping is used to digitize the difference between the behaviors of the sensor data pieces from the similarity between the two sensor data pieces. The difference between the behaviors of the sensor data pieces indicates an individual difference between the substrate processing apparatuses 10 and a difference between device states.

In this way, in the method of digitizing the difference between the behaviors of the sensor data pieces by using dynamic time warping, the time-series data pieces are not summarized into, for example, statistics, and the difference between the behaviors of the sensor data pieces may be directly digitized from the time-series data pieces. Thus, the loss of information is suppressed, and the difference between the behaviors of the sensor data pieces may be more accurately digitized.

For example, when an attempt was made to digitize behaviors of sensor data pieces between the substrate processing apparatuses 10 from log data pieces output from the substrate processing apparatuses 10, statistics such as an average value or a standard deviation at each step of a recipe were calculated from sensor data of each sensor, and the statistics were used to analyze an individual difference between the substrate processing apparatuses 10 in some cases. However, when the individual difference between the substrate processing apparatuses 10 is analyzed by using the statistics, information of sensor data which is time-series data is lost at a point in time when the sensor data pieces are summarized into statistics.

In the present embodiment in which dynamic time warping is used, since the sensor data pieces are not summarized into statistics, it is possible to avoid the problem such as dropping of information of sensor data which is time-series data.

In step S18, the analysis unit 56 determines whether the difference between the analysis target sensor data pieces in the reference substrate processing apparatus 10a and the analysis target substrate processing apparatus 10b, which is analyzed in step S16, is larger than a threshold value.

When the difference between the sensor data pieces analyzed in step S16 is larger than the threshold value, the analysis unit 56 determines that an individual difference is occurring in the substrate processing apparatuses 10, and performs processing of step S20. In step S20, by the analysis unit 56, the information of the analysis target substrate processing apparatus 10b selected in step S12 and the information of the sensor selected in step S14 are associated with each other and are recorded in the analysis result recording unit 58. When the difference between the sensor data pieces analyzed in step S16 is not larger than the threshold value, the analysis unit 56 determines that no individual difference is occurring in the substrate processing apparatuses 10, and skips the processing of step S20.

In step S22, if all the sensors of the analysis target substrate processing apparatus 10b selected in step S12 have not been selected, the analysis unit 56 returns to the processing of step S14, selects one unprocessed sensor from the analysis target sensors, and performs processing in step S16 and subsequent steps. In step S22, if all the sensors of the analysis target substrate processing apparatus 10b selected in step S12 have been selected, the analysis unit 56 proceeds to processing in step S24.

In step S24, if all the analysis target substrate processing apparatuses 10b have not been selected in step S12, the analysis unit 56 returns to the processing in step S12, selects one unprocessed substrate processing apparatus from the analysis target substrate processing apparatuses 10b, and performs processing in step S14 and subsequent steps. In step S24, if all the analysis target substrate processing apparatuses 10b have been selected in step S12, the analysis unit 56 ends the processing in the flowchart of FIG. 5.

Examples of a use case of the analysis method illustrated in FIG. 4 and FIG. 5 are as follows. When a film formation result such as a film thickness is significantly different between the substrate processing apparatuses 10, the difference between behaviors of sensor data pieces is digitized, and then a sensor for which a large difference in the behavior is present between the substrate processing apparatuses 10 is investigated. That is, the analysis method illustrated in FIG. 4 and FIG. 5 may be used for investigating the cause of variations in film formation results.

For example, in the use case of the analysis method illustrated in FIG. 4 and FIG. 5, for sensor data of a temperature sensor that controls the temperature of a reaction furnace, such as a thermocouple (T/C), it is possible to digitize a difference in the degree of overshoot and hunting during the temperature control in the process recipe. Thus, it is possible to check whether there is any difference in the state of the temperature control.

In another example, it is possible to check a difference in the behavior of data of the APC opening degree between the substrate processing apparatuses 10 in order to check, for example, an assembly error of a gas pipe or a reaction furnace in the substrate processing apparatuses 10, or a difference in the pressure control between the substrate processing apparatuses 10. If there is a correlation between the difference in the behavior of data of the APC opening degree between the substrate processing apparatuses 10, and the difference in the film formation result between the substrate processing apparatuses 10, it is possible to investigate the cause of the difference in the film formation result between the substrate processing apparatuses 10 by checking whether another sensor related to a gas or a pressure is present as a sensor for which a large difference is present between the substrate processing apparatuses 10.

In the example of the analysis method illustrated in FIG. 4 and FIG. 5, one reference substrate processing apparatus 10a and a plurality of analysis target substrate processing apparatuses 10b are present, but a plurality of reference substrate processing apparatuses 10a may be present. Further, the reference substrate processing apparatus 10a may be omitted, and trace logs acquired from the plurality of analysis target substrate processing apparatuses 10b may be used so as to analyze individual differences of the analysis target substrate processing apparatuses 10b.

According to the present embodiment, for each time-series data piece, the individual difference between the substrate processing apparatuses 10 may be analyzed, which may be useful for specifying the cause of occurring of the individual difference. Further, according to the present embodiment, it is possible to find an unacceptable individual difference of the substrate processing apparatuses 10 early, which may contribute to, for example, reduction of lots not satisfying required processing specifications.

Analysis and Operation Using Dynamic Time
Warping, on Individual Differences in Substrate
Processing Apparatuses—Part 2

Figure 8:
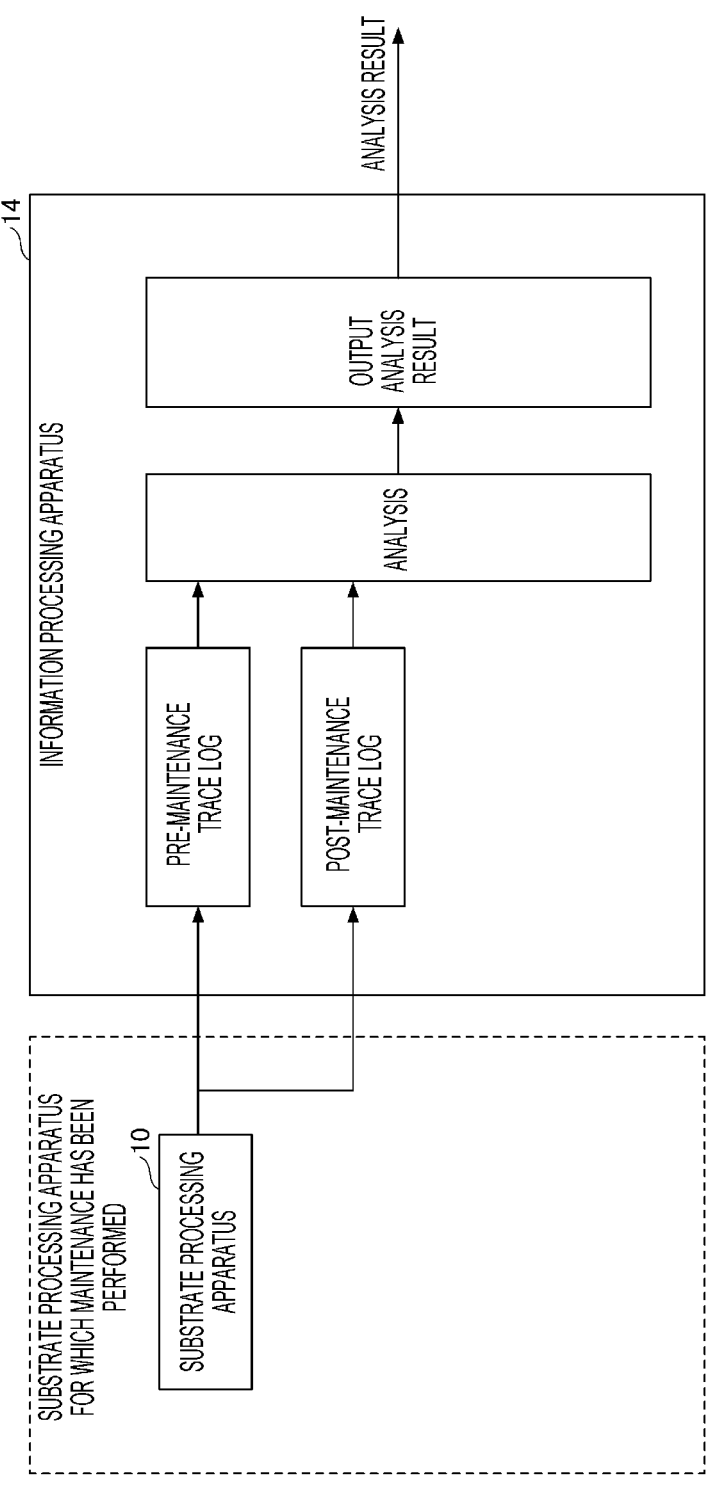
FIG. 8 is an explanatory diagram of an example of a method in the substrate processing system according to the present embodiment, by which an analysis using dynamic time warping, on an individual difference between the substrate processing apparatuses, is useful for the operation of the substrate processing apparatuses.

In the present embodiment, an analysis using dynamic time warping, on an individual difference between the substrate processing apparatuses 10, is useful for the operation of the substrate processing apparatuses 10 as follows. FIG. 8 is an explanatory diagram of an example of a method in the substrate processing system according to the present embodiment, by which an analysis using dynamic time warping, on an individual difference between the substrate processing apparatuses, is useful for the operation of the substrate processing apparatuses.

FIG. 8 illustrates one substrate processing apparatus 10 for which maintenance has been performed. The substrate processing apparatus 10 of FIG. 8 operates the same process according to the same recipe or macro before and after the maintenance. For the substrate processing apparatus 10 that has been subjected to the maintenance, the similarity between sensor data pieces before and after the maintenance is analyzed so as to check an individual difference and a device state difference caused by the maintenance, in the substrate processing apparatus 10. Further, for the substrate processing apparatus that has been subjected to the maintenance, the similarity between sensor data pieces before and after the maintenance is analyzed so as to check whether the maintenance has been normally executed.

The information processing apparatus 14 acquires information related to sensor data of a sensor provided in one substrate processing apparatus 10, as a trace log. The trace log includes sensor data, identification information of a recipe or a macro that was being executed when the sensor data was output from the sensor, and identification information of a step indicating the degree of progress of processing of the recipe or the macro.

The information processing apparatus 14 acquires a pre-maintenance trace log and a post-maintenance trace log. The information processing apparatus 14 uses the pre-maintenance trace log and the post-maintenance trace log of the substrate processing apparatus 10 for which the maintenance has been performed, such that the similarity between sensor data pieces of the same sensor at different timings (e.g., before and after maintenance) is analyzed by using dynamic time warping, and then the difference between the sensor data pieces is digitized.

In the information processing apparatus 14, a sequence to be analyzed, such as a film formation recipe, a purge recipe, or a cleaning recipe, is set. Further, in the information processing apparatus 14, a sensor to be analyzed is set.

The information processing apparatus 14 analyzes a difference between sensor data acquired before the maintenance and sensor data acquired after the maintenance in the same sequence, among analysis target sensor data pieces of the same substrate processing apparatus 10. The information processing apparatus 14 notifies the user of the information of the analysis target sensor for which the difference is larger than a threshold value, as an analysis result.

In the operation illustrated in FIG. 8, the analysis may be executed by instructions of the user, or the analysis may be automatically executed by performing maintenance. In the information processing apparatus 14, a threshold value used for determining whether the difference between the sensor data pieces before and after the maintenance is an allowable value is set. Different threshold values or the same threshold value may be set for sensors.

When the analysis is executed, the information processing apparatus 14 reads a pre-maintenance trace log and a post-maintenance trace log corresponding to the latest processing of the sequence to be analyzed. The information processing apparatus 14 uses the read trace logs to analyze the difference between the sensor data pieces in the analysis target sequence before and after the maintenance, for example, according to the procedure illustrated in FIG. 9.

Figure 9:
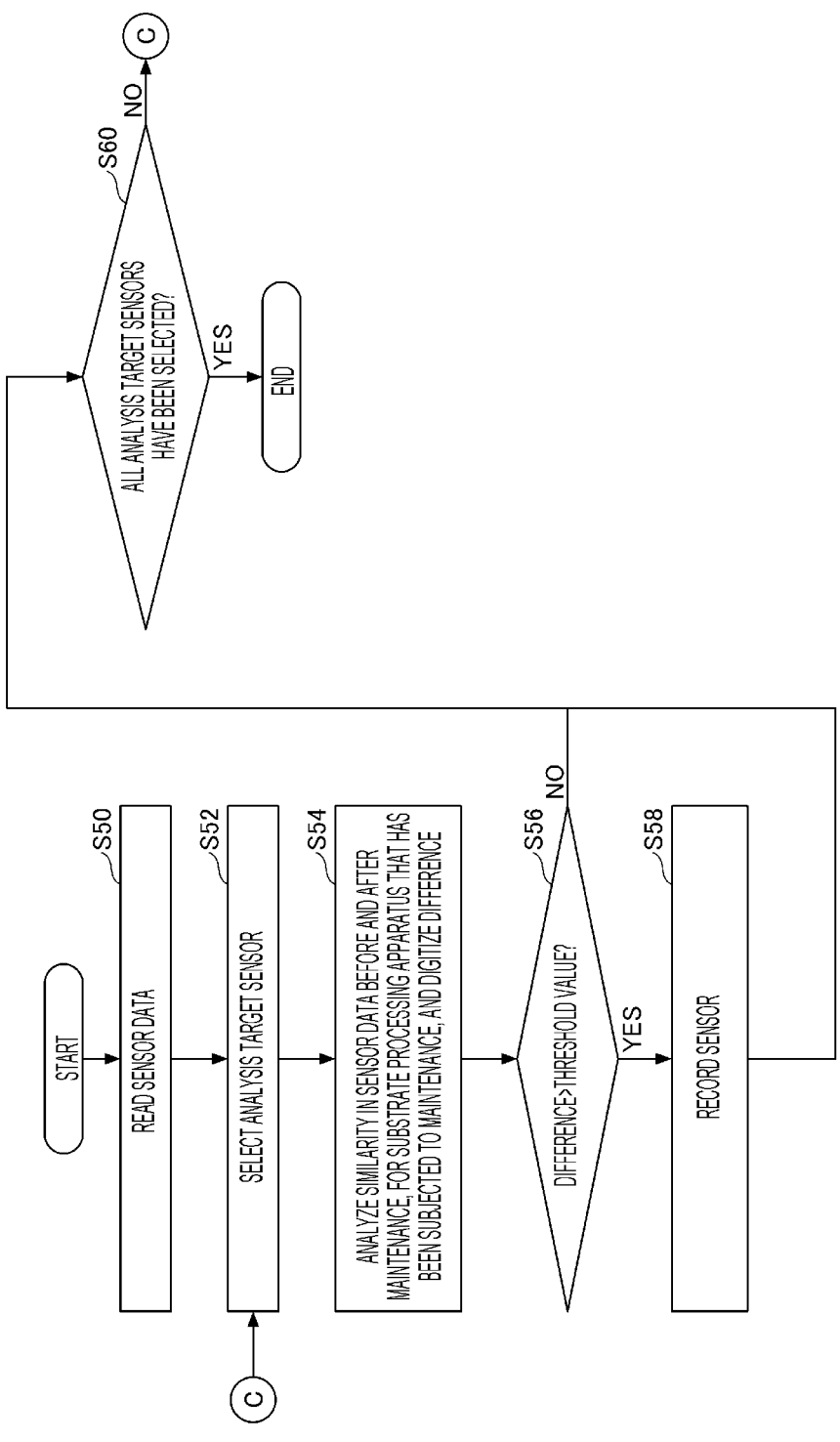
FIG. 9 is a flowchart of an example of processing in an analysis which is performed on a difference in sensor data by the information processing apparatus according to the present embodiment, by using dynamic time warping.

FIG. 9 is a flowchart of an example of processing in an analysis which is performed on the similarity between sensor data pieces by the information processing apparatus according to the present embodiment, by using dynamic time warping. In step S50, the analysis unit 56 of the information processing apparatus 14 reads a pre-maintenance trace log and a post-maintenance trace log of the substrate processing apparatus 10 from the time-series data storage unit 54.

In step S52, the analysis unit 56 selects one unprocessed sensor from analysis target sensors in the substrate processing apparatus 10 that has been subjected to maintenance. The analysis unit 56 takes the sensor selected in step S52, as a target to be analyzed in step S54.

In step S54, the analysis unit 56 uses the pre-maintenance trace log and the post-maintenance trace log of the substrate processing apparatus 10, so as to analyze the similarity in the analysis target sensor before and after the maintenance through dynamic time warping. The analysis using dynamic time warping, on the similarity in sensor data, has been described with reference to FIG. 6 and FIG. 7.

In the present embodiment, the dynamic time warping is used to digitize the difference between the behaviors of sensor data pieces before and after the maintenance, from the similarity between the two sensor data pieces before and after the maintenance. The difference between the behaviors of the sensor data pieces indicates an individual difference and a device state difference in the substrate processing apparatus 10 before and after the maintenance.

In this manner, in the method of digitizing the difference between the behaviors of the sensor data pieces before and after the maintenance by using dynamic time warping, the time-series data pieces are not summarized into, for example, statistics, and the difference between the behaviors of the sensor data pieces may be directly digitized from the time-series data pieces. Thus, the loss of information is suppressed, and the difference between the behaviors of the sensor data pieces may be more accurately digitized.

In step S56, the analysis unit 56 determines whether the difference between the analysis target sensor data pieces before and after the maintenance, which is analyzed in step S54, is larger than a threshold value.

When the difference between the analysis target sensor data pieces (before and after the maintenance) analyzed in step S54 is larger than the threshold value, the analysis unit 56 determines that an individual difference and a device state difference are occurring in the substrate processing apparatus 10 due to the maintenance, and performs the processing of step S58.

In step S58, the analysis unit 56 records the information of the sensor selected in step S52, in the analysis result recording unit 58. When the difference between the sensor data pieces (before and after the maintenance) analyzed in step S54 is not larger than the threshold value, the analysis unit 56 determines that the maintenance has not caused an individual difference and a device state difference in the substrate processing apparatus 10, and skips the processing of step S58.

In step S60, if all the sensors of the substrate processing apparatus 10 have not been selected in step S52, the analysis unit 56 returns to the processing of step S52, selects one unprocessed sensor from the analysis target sensors, and performs processing in step S54 and subsequent steps. In step S60, if all the sensors of the substrate processing apparatus 10 have been selected in step S52, the analysis unit 56 ends the processing in the flowchart of FIG. 9.

In the analysis method illustrated in FIG. 8 and FIG. 9, it is possible to perform an analysis for confirming whether the maintenance itself of the substrate processing apparatus 10 has been normally carried out. The information processing apparatus 14 uses trace logs of a sequence (e.g., a recipe, a macro) such as cleaning or pre-coating which is performed whenever maintenance is carried out. The information processing apparatus 14 may check a difference between behaviors of sensor data pieces before and after the maintenance, between the immediately preceding maintenance and the latest maintenance.

In the analysis method illustrated in FIG. 8 and FIG. 9, it is possible to perform an analysis for checking whether the device state of the substrate processing apparatus 10 has changed due to maintenance. The information processing apparatus 14 uses trace logs of a sequence performed before and after the maintenance. The information processing apparatus 14 may check whether the device state of the substrate processing apparatus 10 has changed due to the maintenance, by checking the difference between behaviors of sensor data pieces of an analysis target sensor before and after the maintenance.

Examples of a use case of the analysis method illustrated in FIG. 8 and FIG. 9 are as follows. The analysis method illustrated in FIG. 8 and FIG. 9 may be used for confirming whether the maintenance itself has been normally carried out.

For example, in the maintenance of the substrate processing apparatus 10, after the accumulated film within a reaction furnace is removed by, for example, dry cleaning, pre-coating is performed so that a processing of forming a thin film within the reaction furnace is performed. When the accumulated film within the reaction furnace is properly removed by, for example, dry cleaning, in the substrate processing apparatus 10, a reaction of a film formation gas is caused on, for example, the inner wall portion of the reaction furnace by the pre-coating treatment, and then the film formation gas is consumed as an accumulated film. Thus, the reaction amount of the film formation gas affects the pressure control during pre-coating.

Meanwhile, when the accumulated film within the reaction furnace is not properly removed by, for example, dry cleaning for some reason, in the substrate processing apparatus 10, the film formation gas is not consumed on, for example, the inner wall portion of the reaction furnace during the pre-coating. Then, the state of pressure control during the pre-coating is different from that in the case where the accumulated film within the reaction furnace is properly removed by, for example, dry cleaning. Therefore, it is thought that the behavior of the APC opening degree of the substrate processing apparatus 10 changes depending on whether the accumulated film within the reaction furnace has been properly removed by, for example, dry cleaning or has not been removed.

Therefore, the present embodiment may be used for a use case where a difference in the behavior of the APC opening degree between the pre-coating treatment to be analyzed and the pre-coating treatment performed in the immediately preceding maintenance is digitized, and then when there is a large difference in the behavior, the user is notified of the fact that dry cleaning may not have been properly performed.

Further, for example, in the maintenance of the substrate processing apparatus it is possible to perform an analysis for checking whether the device state has been changed due to maintenance. When a temperature sensor such as a thermocouple in the reaction furnace is replaced in the maintenance, an individual difference of thermocouples or an assembly error may occur. In some cases, in the substrate processing apparatus 10 for which the maintenance has been performed, due to the influence of an individual difference of thermocouples or an assembly error, the behavior of a power value related to a heater that controls a thermocouple as a replacement is changed before and after the maintenance.

As a result, in the substrate processing apparatus 10 for which the maintenance has been performed, a wafer temperature that greatly affects the film formation result may change before and after the maintenance in some cases. If the film formation processing is performed in a device state where the wafer temperature has changed, there is a possibility that the film formation result made by the substrate processing apparatus 10 changes, and the wafer will not be usable as a product.

When the thermocouple of the reaction furnace is replaced, the substrate processing apparatus 10 is stopped. For example, in the present embodiment, it is assumed that the sensor data pieces, which are acquired in sequences necessarily performed before shutdown of the substrate processing apparatus 10 whose thermocouple in the reaction furnace is to be replaced and after startup of the substrate processing apparatus 10 whose thermocouple in the reaction furnace has been replaced, are used.

The present embodiment may be used for a use case where the difference in the behavior of a power value of a heater that controls a thermocouple is checked before and after the maintenance, and then if the difference in the behavior is larger than a threshold value, the user is instructed to tune the thermocouple as a replacement.

According to the present embodiment, for each time-series data piece, a change of a device state of one substrate processing apparatus 10 may be analyzed, which may be useful for specifying the cause of occurring of the individual difference for example before and after the maintenance. Further, according to the present embodiment, it is possible to find an unacceptable individual difference in the substrate processing apparatus 10 before and after the maintenance early, which may contribute to, for example, reduction of lots not satisfying required processing specifications.

According to the present disclosure, it is possible to provide a technique of analyzing individual differences of substrate processing apparatuses.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

What is claimed is:

1. An information processing apparatus comprising:
a memory; and
a processor coupled to the memory and configured to:
acquire a plurality of time-series data pieces output from one or more substrate processing apparatuses, the plurality of time-series data pieces indicating a device state of the one or more substrate processing apparatuses;

analyze similarity between the plurality of time-series data pieces acquired from the one or more substrate processing apparatuses that are performing a processing according to a same sequence, by using dynamic time warping, thereby digitizing a difference between the plurality of time-series data pieces;

an output control circuitry configured to output information indicating at least one of the plurality of substrate processing apparatuses or a sensor for which the difference between the time-series data pieces exceeds a predetermined threshold value; and automatically determine, based on the output information, whether an abnormal individual difference or an abnormality of the device state has occurred in the one or more substrate processing apparatuses, and whether a maintenance of the one or more substrate processing apparatuses has been performed.

2. The information processing apparatus according to claim 1, wherein the processor is configured to acquire sensor data pieces output from one or more sensors provided in the one or more substrate processing apparatuses, as the plurality of time-series data pieces.

3. The information processing apparatus according to claim 2, wherein the processor is configured to analyze similarity between the sensor data pieces as analysis targets acquired from the one or more substrate processing apparatuses that are performing the processing according to the same sequence, thereby digitizing a difference between behaviors of the sensor data pieces.

4. The information processing apparatus according to claim 1, wherein the processor is configured to:

analyze similarity between first time-series data piece and second time-series data piece respectively acquired from a first substrate processing apparatus and a second substrate processing apparatus that are performing the processing according to the same sequence, thereby digitizing a difference between the first time-series data piece and the second time-series data piece, and output, as a part of the information, identification information of the second time-series data piece of which the difference is larger than the predetermined threshold value, and identification information of the second substrate processing apparatus from which the second time-series data piece is acquired, based on the information.

5. The information processing apparatus according to claim 1, wherein the processor is configured to;

analyze similarity between first time-series data piece and second time-series data piece acquired before and after maintenance, respectively, from one substrate processing apparatus, thereby digitizing a difference between the first time-series data piece and the second time-series data piece, and output, as a part of the information, identification information of the second time-series data piece of which the difference is larger than the predetermined threshold value.

6. The information processing apparatus according to claim 1, wherein the plurality of time-series data pieces includes identification information of a recipe or a macro that are being executed, and identification information of a step indicating a degree of progress of processing of the recipe or the macro.

7. A non-transitory computer-readable storage medium having stored therein a program that, when executed, causes a computer to execute a process performed by an information processing apparatus, the process including:

acquiring, by the computer, a plurality of time-series data pieces output from one or more substrate processing apparatuses, the plurality of time-series data pieces indicating a device state of the one or more substrate processing apparatuses;

analyzing, by the computer, similarity between the plurality of time-series data pieces acquired from the one or more substrate processing apparatuses that are performing a processing according to a same sequence, by using dynamic time warping, thereby digitizing a difference between the time-series data pieces;

outputting, by the computer, information indicating at least one of the plurality of substrate processing apparatuses or a sensor for which the difference between the time-series data pieces exceeds a predetermined threshold value; and automatically determining, by the computer and based on the output information, whether an abnormal individual difference or an abnormality of the device state has occurred in the one or more substrate processing apparatuses, and whether a maintenance of the one or more substrate processing apparatuses has been performed.

8. The non-transitory computer-readable storage medium according to claim 7, wherein the plurality of time-series data pieces includes identification information of a recipe or a macro that are being executed, and identification information of a step indicating a degree of progress of processing of the recipe or the macro.

9. An analysis method comprising:

providing a substrate processing system including one or more substrate processing apparatuses;

and an information processing apparatus communicably connected to the substrate processing apparatuses, the information processing apparatus including a memory, and a processor coupled to the memory, acquiring, by the processor, a plurality of time-series data pieces output from the substrate processing apparatuses, analyzing, by the processor, similarity between the time-series data pieces acquired from the substrate processing apparatuses that are performing a processing according to the same sequence, by using dynamic time warping, thereby digitizing a difference between the time-series data pieces;

outputting, by the processor, information indicating at least one of the plurality of substrate processing apparatuses or a sensor for which the difference between the time-series data pieces exceeds a predetermined threshold value; and automatically determining, by the processor and based on the output information, whether an abnormal individual difference or an abnormality of the device state has occurred in the one or more substrate processing apparatuses, and whether a maintenance of the one or more substrate processing apparatuses has been performed.

10. The analysis method according to claim 9, wherein the plurality of time-series data pieces includes identification information of a recipe or a macro that are being executed, and identification information of a step indicating a degree of progress of processing of the recipe or the macro.

* * * * *